United States Patent Office

2,705,226
Patented Mar. 29, 1955

2,705,226

PRODUCTION OF VINYL CHLORIDE POLYMERS

Alexander Edward Bond, New Malden, England, assignor to Imperial Chemical Industries Limited, London, England, a corporation of Great Britain No Drawing. Application January 5, 1953,
Serial No. 329,723

Claims priority, application Great Britain
January 30, 1952

8 Claims. (Cl. 260—45.5)

This invention relates to the production of vinyl chloride polymers.

In many applications of vinyl chloride polymers, the polymers are used in a plasticised form. Plasticised vinyl chloride polymer compositions are produced by subjecting the polymer and plasticiser to a special compounding process in order to obtain a composition having the characteristics required to make it suitable for the production of shaped articles by extrusion, injection moulding, calendering and similar processes. The compounding process is a lengthy one and entails the use of comparatively expensive mixing machines. As a result, the production of vinyl chloride polymers which compound particularly readily with plasticiser and thus make possible a reduction in the time required for compounding is a matter of commercial importance.

Vinyl chloride polymers which compound particularly readily with plasticisers are also valuable in that they are desirable for the production of free-flowing plasticised powders. Such powders are particularly useful for the production of articles by extrusion and injection moulding.

An object of the present invention is to provide a process for the production of vinyl chloride polymers which compound particularly readily with plasticisers. A further object is to produce vinyl chloride polymers which are particularly suitable for the production of plasticised vonyl chloride polymer powders.

According to the present invention we provide a process which comprises polymerising vinyl chloride dispersed by agitation in an aqueous solution of an alkali-metal or ammonium salt of an acid ester of a partially or completely esterified polyvinyl alcohol in which some of the hydroxyl groups are esterified by acetic acid and some by one or more polybasic acids which contain two carboxyl groups attached to adjacent carbon atoms and not more than one hydroxyl group, and which if unsaturated are of the cis formation.

The alkali-metal or ammonium salt of the acid ester may be prepared as described in British specification No. 602,974 by heating polyvinyl acetate and the one or more polybasic acids in such relative proportions and to a temperature and for a period of time at least sufficient to form a partially thickened alkali soluble mass, washing the thickened mass thus formed until free from excess acid, adding an alkali until the pH is adjusted to 7, and then, if desired, diluting the resulting concentrated solution and adding caustic alkali to cause hydrolysis.

The polybasic acid or acids used in the production of the alkali-metal or ammonium salts of the acid ester may be aliphatic or aromatic in character. Examples of suitable acids include succinic, citric, maleic, malic and phthalic acids. The preferred acids are maleic and phthalic acids.

Instead of using the free polybasic acid, a mixture of the anhydride and water may, if desired, be used. In the production of maleic acid derivatives, for example, it may be more convenient to heat a mixture of polyvinyl acetate, maleic anhydride and water, instead of polyvinyl acetate and maleic acid. It is in fact possible, as described in British specification No. 615,778, by this procedure to produce a partially hydrolysed polyvinyl acetate/maleate in one step. As disclosed in British specification No. 615,778, this may also be achieved by heating a mixture of polyvinyl acetate, maleic acid and water.

The composition of the acid ester from which the alkali-metal or ammonium salt is derived may conveniently be analysed and expressed in terms of the proportions in vinyl alcohol, vinyl acetate and monovinyl ester of the polybasic acids or acids present in the molecule. It is preferred that for every molar proportion of monovinyl ester of polybasic acid present in the molecule there shall be a total of between 5.48 and 14.6 molar proportions of vinyl alcohol and vinyl acetate. If an alkali-metal or ammonium salt of a completely esterified polyvinyl alcohol is employed, the relative molar proportions of the monovinyl ester of polybasic acid and vinyl acetate preferably still lie between the above limits.

The amount of the alkali-metal or ammonium salt of the acid ester employed depends upon a number of factors, such as, for example, the ratio of monomer to water and the size of polymer particle which it is desired to produce. As the ratio of the monomer to water is reduced, less of the alkali-metal or ammonium salt of the acid ester is required. If this ratio is kept constant, the average size of the polymer particles increases as the amount of the alkali-metal or ammonium salt of the acid ester is decreased until eventually the polymeric product obtained contains a large proportion of bead-like particles which tend to float on the surface of the water. The amount of the alkali-metal or ammonium salt of the acid ester employed is usually between about 0.05% and about 0.5% by weight of the water present.

The polymerisation may be effected by heating the mixture, e. g. to between about 30° and about 70° C., and is preferably activated by a catalyst. Examples of suitable catalyst include organic peroxides, such as benzoyl, succinyl, caporyl, lauryl, diethyl and ditertiary butyl peroxide, hyponitrous esters, e. g. benzyl hyponitrite, azo compounds having molecules containing the group

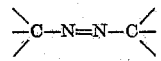

in which the two carbon atoms are non-aromatic in character, e. g. αα'-azodiisobutyronitrile, αα'-bis(αγdimethyl valeronitrile) and dimethyl αα'-azodiisobutyrate, hydrogen peroxide and water-soluble persulphates such as alkali-metal and ammonium persulphates. Irradiation with ultra-violet light may also be used to promote the polymerisation. Oxygen is preferably excluded from the reaction vessel.

In order to prevent separation of the monomer or premature settling of the polymer, the mixture should be agitated during the polymerisation, e. g. by stirring, shaking or tumbling. The agitation should not be so violent, however, as to give rise to the formation of appreciable quantities of permanent emulsion.

Ancillary ingredients such as dyes, pigments, fillers, plasticisers and heat and light stabilisers may be present during the polymerisation provided that they do not have an undesirable effect on the rate or course of the polymerisation.

The process of the present invention may be applied to the polymerisation of mixtures of vinyl chloride with other copolymerisable compounds as well as to the polymerisation of vinyl chloride alone. Examples of compounds with which vinyl chloride may be copolymerised include vinyl acetate, vinyl propionate, vinyl butyrate, vinylidene chloride, acrylonitrile, ethyl acrylate, methyl methacrylate, methyl α-chloroacrylate, maleic acid, fumaric acid, diethyl maleate and diethyl fumarate.

The product of the polymerisation is obtained in the form of solid granules which may be isolated from the reaction mixture conveniently by filtration and washed with water to remove as far as possible any of the alkali-metal or ammonium salt of the acid ester adhering to them.

The polymer is found to have good stability to heat and light and discolours but little when subjected to the usual processing conditions. It may be used in any of the processes of treatment commonly applied to vinyl chloride polymers, such as, for example, moulding, extrusion and calendering. On account of the ease with which it may be compounded with plasticisers, it is very suitable for use in those applications calling for the use of plasticised compositions, such as, for example, cable insulation, cable sheathing, electrical fittings, hose piping, flexible cords, dolls, toys, thin sheeting for raincoats, curtains and the like, and thick sheeting for handbags, upholstery and the like.

Polymers which are particularly suitable for the production of plasticised powders for use in extrusion, injection moulding and similar processes may be produced by the process of the present invention. Plasticised powders may be produced, for example, by the method of British patent application No. 654,477 (now void). In order that such plasticised powders may be free-flowing, at least 85%, and preferably at least 95%, by weight of the polymer should consist of particles having diameters greater than 76 microns.

Our invention is illustrated, but not limited, by the following examples in which all parts are by weight.

*Example I*

Into a stainless steel autoclave fitted with a stirrer and means for heating and for evacuating the autoclave, were introduced 100 parts of distilled water, 0.088 part of $\alpha\alpha'$-azodiisobutyronitrile and 0.10 part of a sodium salt obtained by neutralising the free acidic groups in a partial mixed ester of polyvinyl alcohol containing acetate groups and singly linked maleate groups, the partial mixed ester being prepared from a polyvinyl acetate having a molecular weight of 33,000 as determined by osmotic pressure measurements and the proportion of vinyl alcohol in its molecule being 9% by weight. The autoclave was evacuated to a residual air pressure of 3 inches of mercury. 59 parts of vinyl chloride were blown into the autoclave under nitrogen pressure.

The contents of the autoclave were then heated to 50° C. with stirring, whereupon the pressure rose to 100 lb./sq. inch. After 15 hours the pressure dropped to 60 lb./sq. inch, and the residual vinyl chloride was released. The polymer was isolated by filtration and was then washed with warm water and dried.

The product had a weight mean particle diameter of 212 microns, and on account of its ease of compounding with plasticiser, readily gave free-flowing plasticised powders.

*Example II*

Example I was repeated but using twice as much dispersing agent, i. e. 0.20 part. The resulting polymer was similar to that obtained in Example I except that it had a weight mean particle diameter of 141 microns.

*Example III*

Into a stainless steel autoclave fitted with a stirrer and means for heating and for evacuating the autoclave, were introduced 100 parts of distilled water, 0.10 part of $\alpha\alpha'$-azodiisobutyronitrile and 0.15 part of a sodium salt obtained by neutralising the free acidic groups in a partial mixed ester of polyvinyl alcohol containing acetate groups and singly linked phthalate groups, the partial mixed ester being prepared from a polyvinyl acetate having a molecular weight of 33,000 as determined by osmotic pressure measurements and the proportion of vinyl alcohol in its molecule being 9% by weight. Air was displaced from the autoclave by nitrogen. 50 parts of vinyl chloride were blown into the autoclave under nitrogen pressure.

The contents of the autoclave were then heated to 50° C. with stirring. After 14 hours the residual vinyl chloride was released. The polymer was isolated by filtration and was then washed with warm water and dried. The product had a weight mean particle diameter of 50 microns.

*Example IV*

Example III was reepated but using, in place of the sodium salt of the partial mixed ester of polyvinyl alcohol, 0.20 part of a sodium salt obtained by neutralising the free acid groups in a completely esterified polyvinyl alcohol containing acetate groups and singly linked maleate groups, the completely esterified polyvinyl alcohol being derived from a polyvinyl acetate having a molecular weight of 33,000 as determined by osmotic pressure measurements and the proportion of vinyl maleate in its molecule being 17% by weight.

The resulting polymer had a weight mean average particle diameter of 140 microns.

I claim:

1. A process for the production of vinyl chloride polymers that compound easily and readily with plasticisers which comprises dispersing vinyl chloride by agitating the same in an aqueous solution containing a salt selected from the group consisting of the alkali metal and ammonium salts of an at least partially esterified polyvinyl alcohol in which part of the hydroxyl groups are esterified by acetic acid and part are esterified by at least one polybasic acid which contains two carboxyl groups attached to adjacent carbon atoms, and no more than one hydroxyl group, and which, when unsaturated, is of cis formation, and thereafter polymerizing the thus dispersed vinyl chloride.

2. A process according to claim 1 wherein said polybasic acid is maleic acid.

3. A process according to claim 1 wherein said polybasic acid is phthalic acid.

4. A process according to claim 1 wherein for every molar proportion of monovinyl ester of polybasic acid present in the molecule of the acid ester there is a total of between 5.48 and 14.6 molar proportions of vinyl alcohol and vinyl acetate.

5. A process according to claim 1 wherein the amount of the alkali-metal or ammonium salt of the acid ester employed is between 0.05% and 0.5% by weight of the water present.

6. A process according to claim 1 wherein the polymerisation is effected at between 30° and 70° C. and is activated by a catalyst.

7. A process according to claim 1 wherein oxygen is excluded from the reaction vessel.

8. A process according to claim 1 wherein the vinyl chloride is polymerised with a copolymerisable compound.

References Cited in the file of this patent

UNITED STATES PATENTS

| | | |
|---|---|---|
| 2,324,426 | Robie | July 13, 1943 |
| 2,511,811 | Baer | June 13, 1950 |

FOREIGN PATENTS

| | | |
|---|---|---|
| 615,778 | Great Britain | Jan. 11, 1949 |